United States Patent
Nyuugaku et al.

(10) Patent No.: US 12,365,766 B2
(45) Date of Patent: Jul. 22, 2025

(54) ORGANOPOLYSILOXANE COMPOSITION

(71) Applicant: Shin-Etsu Chemical Co., Ltd., Tokyo (JP)

(72) Inventors: Takeshi Nyuugaku, Joetsu (JP); Koichi Nakazawa, Joetsu (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 510 days.

(21) Appl. No.: 17/888,598

(22) Filed: Aug. 16, 2022

(65) Prior Publication Data
US 2023/0078106 A1    Mar. 16, 2023

(51) Int. Cl.
| | | |
|---|---|---|
| *C09D 183/08* | (2006.01) | |
| *C08G 77/16* | (2006.01) | |
| *C08G 77/26* | (2006.01) | |
| *C08J 3/12*   | (2006.01) | |
| *C08K 5/09*   | (2006.01) | |

(52) U.S. Cl.
CPC ............ *C08G 77/26* (2013.01); *C08G 77/16* (2013.01); *C08J 3/122* (2013.01); *C08K 5/09* (2013.01)

(58) Field of Classification Search
CPC .................................................. C09D 183/08
USPC ..................................... 106/287.11
See application file for complete search history.

(56) References Cited

U.S. PATENT DOCUMENTS

| | | | | |
|---|---|---|---|---|
| 3,252,825 | A * | 5/1966 | 051966 ................... | C03C 25/40 525/61 |
| 5,879,436 | A * | 3/1999 | Kramer ..................... | C08F 8/42 556/466 |
| 11,369,114 | B2 * | 6/2022 | Grossman .............. | A01N 25/10 |
| 2006/0269760 | A1 * | 11/2006 | Sugama ................ | B82Y 30/00 428/689 |
| 2020/0068897 | A1 | 3/2020 | Grossman et al. | |

FOREIGN PATENT DOCUMENTS

JP    10-17578 A    1/1998

* cited by examiner

*Primary Examiner* — Margaret G Moore
(74) *Attorney, Agent, or Firm* — Birch, Stewart, Kolasch & Birch, LLP

(57) ABSTRACT

Disclosed is a transparent organopolysiloxane composition consisting of a powdery silicone resin having the following general formula (1), a carboxylic acid compound or a natural oil containing the carboxylic acid compound, and an aprotic solvent.

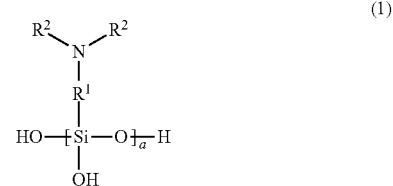

(1)

(wherein $R^1$ each independently represents a substituted or unsubstituted divalent hydrocarbon group having 1 to 20 carbon atoms which may contain a hetero atom, $R^2$ each independently represents a hydrogen atom, a methyl group, or an ethyl group, and a represents an integer of 2 to 70).

5 Claims, No Drawings

ORGANOPOLYSILOXANE COMPOSITION

CROSS-REFERENCE TO RELATED APPLICATION

This non-provisional application claims priority under 35 U.S.C. § 119(a) on Patent Application Nos. 2021-143095, 2021-168967 and 2022-123039 filed in Japan on Sep. 2, 2021, Oct. 14, 2021 and Aug. 2, 2022, respectively, the entire contents of which are hereby incorporated by reference.

TECHNICAL FIELD

The present invention relates to an organopolysiloxane composition.

BACKGROUND ART

In an organosilicon compound having a hydrolyzable silyl group and an organic group, a silanol group generated by hydrolysis of the hydrolyzable silyl group forms a covalent bond with a hydroxyl group on a surface of an inorganic material, and the organic group reacts with an organic material, so that it is possible to bond the organic material and the inorganic material which are usually difficult to be bonded together. This makes it possible to impart properties such as heat resistance, water resistance, weather resistance, improvement in mechanical strength, adhesion, dispersibility, hydrophobicity, and rust prevention to an organic-inorganic composite material.

Utilizing these properties, the organosilicon compound is used in a wide range of fields and applications such as a silane coupling agent, a resin additive, a surface treatment agent, a fiber treatment agent, an adhesive agent, a paint additive, and a polymer modifier.

Among the above organosilicon compounds, an amino group-containing aminosilane compound can enhance the adhesion of the organic-inorganic composite material because the amino group exhibits high reactivity to various organic materials and inorganic materials.

Examples of such an aminosilane compound include 3-aminopropyltrimethoxysilane (Patent Document 1). Examples of the organopolysiloxane composition obtained by hydrolyzing the aminosilane compound include 3-aminopropylsilane triol homopolymer (Patent Document 2).

CITATION LIST

Patent Document 1: JP-A H10-17578
Patent Document 2: US 2020/0068897 A

SUMMARY OF THE INVENTION

However, in the aminosilane compound having an alkoxysilyl group described in Patent Document 1, a considerable amount of alcohol is generated by hydrolysis of the alkoxysilyl group. In recent years, reduction of volatile organic compounds (VOC) has been a major theme in environmental problems deeply related to global warming, health problems, and the like. The aminosilane compound generates a large amount of alcohol, and there is a concern about a load on the environment.

In this regard, the organopolysiloxane composition having an amino group and a silanol group described in Patent Document 2 is a silanol condensate produced by hydrolyzing an aminosilane compound having an alkoxysilyl group, and the generated alcohol can be removed after the hydrolysis; therefore, the organopolysiloxane composition is useful as one of methods for reducing the amount of alcohol generated from the aminosilane compound.

Since the organopolysiloxane composition is a silanol condensate having a plurality of silanol groups, there is also an advantage that the organopolysiloxane composition has excellent reactivity to a hydroxyl group on a substrate surface. That is, in the hydrolysis reaction of the aminosilane compound, silanol groups are condensed to produce a silanol condensate having a linear, branched, cyclic, or three-dimensional network structure. Since the condensation between the silanol groups reaches equilibrium by interaction between the silanol group and the amino group, a plurality of silanol groups are present in the silanol condensate in a state of not being condensed. This makes it possible for the plurality of silanol groups to react with a plurality of hydroxyl groups on the substrate surface, thereby improving adhesion to an organic-inorganic composite material.

However, in the organopolysiloxane composition having an amino group and a silanol group described in Patent Document 2, although the generated alcohol can be removed, a solvent exhibiting compatibility is limited to water or a protic solvent such as a lower alcohol, and therefore, a uniform and transparent solution cannot be prepared when an aprotic solvent is used. That is, the silanol condensate contained in the organopolysiloxane composition exhibits hydrophilicity derived from the plurality of silanol groups, and therefore is precipitated or separated as a solid (crystalline substance) or a liquid (oily substance) having low compatibility with the aprotic solvent. In the case of a non-uniform and opaque solution containing the solid or the liquid, the solution cannot be sufficiently in contact with various organic materials and inorganic materials, and therefore, the reactivity with the hydroxyl group on the substrate surface is reduced. In the case of a solution containing the protic solvent such as water or a lower alcohol, since compatibility with a hydrophobic organic material and a hydrophobic inorganic material is low, the solution cannot be applied in the application of blending these materials.

Therefore, it is desired to develop a uniform and transparent organopolysiloxane composition having an amino group and a silanol group, which has solubility in an aprotic solvent and can improve compatibility with a hydrophobic organic material and a hydrophobic inorganic material while suppressing generation of alcohol when used as a silane coupling agent or a fiber treatment agent.

The present invention has been made in view of the above circumstances, and an object of the present invention is to provide a uniform and transparent organopolysiloxane composition having an amino group and a silanol group, which is dissolved in an aprotic solvent and can improve compatibility with a hydrophobic organic material and a hydrophobic inorganic material while suppressing generation of alcohol when used as a silane coupling agent or a fiber treatment agent.

As a result of intensive studies to achieve the above object, the present inventors have found that since a powdery silicone resin having an amino group and a silanol group is dissolved in an aprotic solvent by interaction with a carboxylic acid compound, a uniform and transparent solution (composition) in which precipitation of a solid or separation of a liquid does not occur is formed, when this composition is used as a silane coupling agent or a fiber treatment agent, alcohol is not generated, and compatibility with a hydrophobic organic material and a hydrophobic inorganic material is improved, thereby completing the invention.

That is, the present invention provides the following 1 to 5.

1. A transparent organopolysiloxane composition consisting of a powdery silicone resin having the following general formula (1), a carboxylic acid compound or a natural oil containing the carboxylic acid compound, and an aprotic solvent,

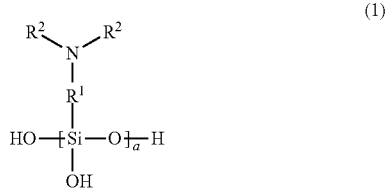

(wherein $R^1$ each independently represents a substituted or unsubstituted divalent hydrocarbon group having 1 to 20 carbon atoms which may contain a hetero atom, $R^2$ each independently represents a hydrogen atom, a methyl group, or an ethyl group, and a represents an integer of 2 to 70).

2. The organopolysiloxane composition according to 1, wherein a mean particle size of the silicone resin measured by a dry laser diffraction method is 1 to 200 µm as a volume-based median diameter.
3. The organopolysiloxane composition according to 1 or 2, wherein the silicone resin is spray-dried particles.
4. The organopolysiloxane composition according to any one of 1 to 3, wherein the carboxylic acid compound is one or two or more selected from a saturated monocarboxylic acid compound having 1 to 11 carbon atoms and an unsaturated monocarboxylic acid compound having 3 to 22 carbon atoms.
5. The organopolysiloxane composition according to any one of 1 to 4, wherein the aprotic solvent is one or two or more selected from a saturated aliphatic hydrocarbon-based solvent, an unsaturated aliphatic hydrocarbon-based solvent, an aromatic hydrocarbon-based solvent, and a ketone-based solvent.

Advantageous Effects of the Invention

The organopolysiloxane composition of the present invention can be prepared as a uniform and transparent solution in which precipitation of a solid or separation of a liquid does not occur.

Since the organopolysiloxane composition of the present invention exhibits high compatibility with a hydrophobic organic material and a hydrophobic inorganic material, when the organopolysiloxane composition is used as a silane coupling agent or a fiber treatment agent, adhesion to an organic-inorganic composite material can be enhanced.

DESCRIPTION OF THE PREFERRED EMBODIMENT

Hereinafter, the present invention will be specifically described.

The organopolysiloxane composition of the present invention is consists of a powdery silicone resin (hereinafter, referred to as "silicone resin (1)") having the following general formula (1), a carboxylic acid compound or a natural oil containing the carboxylic acid compound, and an aprotic solvent.

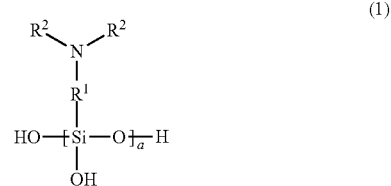

In the general formula (1), $R^1$ each independently represents a substituted or unsubstituted divalent hydrocarbon group having 1 to 20 carbon atoms, preferably 1 to 10 carbon atoms, and more preferably 1 to 8 carbon atoms, which may contain a hetero atom.

The divalent hydrocarbon group of $R^1$ may be linear, branched, or cyclic, and specific examples thereof include linear alkylene groups such as methylene, dimethylene, trimethylene, tetramethylene, pentamethylene, hexamethylene, heptamethylene, octamethylene, nonamethylene, decamethylene, undecamethylene, dodecamethylene, tridecamethylene, tetradecamethylene, pentadecamethylene, hexadecamethylene, heptadecamethylene, octadecamethylene, nonadecamethylene, and icosamethylene groups; branched chain alkylene groups such as isopropylene, isobutylene, sec-butylene, tert-butylene, isopentylene, isohexylene, isoheptylene, iso-octylene, isononylene, isodecylene, iso-undecylene, iso-dodecylene, isotridecylene, isotetradecylene, isopentadecylene, isohexadecylene, isoheptadecylene, iso-octadecylene, isononadecylene, and iso-icosylene groups; cyclic alkylene groups such as cyclopropylene, cyclobutylene, cyclopentylene, cyclohexylene, cycloheptylene, cyclooctylene, cyclononylene, cyclodecylene, cycloundecylene, cyclododecylene, cyclotridecylene, cyclotetradecylene, cyclopentadecylene, cyclohexadecylene, cycloheptadecylene, cyclooctadecylene, cyclononadecylene, and cycloicosylene; alkenylene groups such as ethenylene, propenylene, butenylene, pentenylene, hexenylene, heptenylene, octenylene, nonylene, decenylene, undecenylene, dodecenylene, tridecenylene, tetradecenylene, pentadecenylene, hexadecenylene, heptadecenylene, octadecenylene, nonadecenylene, and icosenylene groups; arylene groups such as phenylene and naphthylene groups; and aralkylene groups such as methylenephenylene and methylenephenylenemethylene groups.

Examples of the divalent hydrocarbon group containing a hetero atom of $R^1$ include an alkyleneaminoalkylene group, an alkyleneoxyalkylene group, and an alkylenethioalkylene group, and examples of these alkylene groups each independently include groups similar to the groups exemplified for the linear, branched, and cyclic alkylene groups.

Some or all of the hydrogen atoms of these divalent hydrocarbon groups may be substituted with other substituents, and specific examples of this substituent include alkoxy groups having 1 to 4 carbon atoms such as methoxy, ethoxy, and (iso)propoxy groups; halogen atoms such as fluorine, chlorine, and bromine; aryl groups such as phenyl, tolyl, and xylyl groups; aralkyl groups such as benzyl and phenethyl groups; cyano groups, amino groups, ester groups, ether groups, carbonyl groups, acyl groups, and sulfide groups, and one kind or two or more kinds thereof can be used in combination. The substitution positions of these substituents are not particularly limited, and the number of substituents is also not limited.

Among them, $R^1$ is preferably an unsubstituted linear, branched or cyclic alkylene group having 1 to 8 carbon atoms; an alkenylene group; an arylene group; an aralkylene group; an alkyleneaminoalkylene group; an alkyleneoxyalkylene group; or an alkylene thioalkylene group, and in particular, from the viewpoint of availability of a precursor raw material, $R^1$ is more preferably an unsubstituted linear or branched alkylene group having 1 to 6 carbon atoms; or an alkyleneaminoalkylene group, and still more preferably a methylene group, a dimethylene group, a trimethylene group, an isopropylene group, a methyleneaminomethylene group, a methyleneaminodimethylene group, a methyleneaminotrimethylene group, a dimethyleneaminomethylene group, a dimethyleneaminodimethylene group, a dimethyleneaminotrimethylene group, a trimethyleneaminomethylene group, a trimethyleneaminodimethylene group, or a trimethyleneaminotrimethylene group.

In the general formula (1), $R^2$ each independently represents a hydrogen atom, a methyl group, or an ethyl group, is preferably a hydrogen atom or a methyl group, and particularly preferably a hydrogen atom from the viewpoint of availability of the precursor raw material.

In the general formula (1), a is an integer of 2 to 70, and is preferably 2 to 60, more preferably 2 to 50, still more preferably 2 to 40, even more preferably 5 to 40, particularly preferably 15 to 40, and most preferably 20 to 40, particularly from the viewpoint of compatibility with an aprotic solvent.

An amine value of the silicone resin (1) is measured to find a range of a in the general formula (1). Here, the amine value is a value indicating an amount of organic amine in a sample, and is calculated by measuring mg of potassium hydroxide (KOH) in an amount equivalent to acid required to neutralize an amino group of the organic amine contained in 1 g of the sample by potentiometric titration.

Specific examples of the silicone resin (1) include silicone resins having a primary amino group, such as 1-aminomethylsilane triol homopolymer, 2-aminoethylsilane triol homopolymer, 2-aminoisopropylsilane triol homopolymer, and 3-aminopropylsilane triol homopolymer; silicone resins having a secondary amino group, such as N-methyl-1-aminomethylsilane triol homopolymer, N-methyl-2-aminoethylsilane triol homopolymer, N-methyl-2-aminoisopropylsilane triol homopolymer, and N-methyl-3-aminopropylsilane triol homopolymer; silicone resins having a tertiary amino group, such as N,N-dimethyl-1-aminomethylsilane triol homopolymer, N,N-dimethyl-2-aminoethylsilane triol homopolymer, N,N-dimethyl-2-aminoisopropylsilane triol homopolymer, and N,N-dimethyl-3-aminopropylsilane triol homopolymer; and silicone resins having a diamino group, such as N-(1-aminomethyl)-1-aminomethylsilane triol homopolymer, N-(1-aminomethyl)-2-aminoethylsilane triol homopolymer, N-(1-aminomethyl)-2-aminoisopropylsilane triol homopolymer, N-(1-aminomethyl)-3-aminopropylsilane triol homopolymer, N-(2-aminoethyl)-1-aminomethylsilane triol homopolymer, N-(2-aminoethyl)-2-aminoethylsilane triol homopolymer, N-(2-aminoethyl)-2-aminoisopropylsilane triol homopolymer, N-(2-aminoethyl)-3-aminopropylsilane triol homopolymer, N-(2-aminoisopropyl)-1-aminomethylsilane triol homopolymer, N-(2-aminoisopropyl)-2-aminoethylsilane triol homopolymer, N-(2-aminoisopropyl)-2-aminoisopropylsilane triol homopolymer, N-(2-aminoisopropyl)-3-aminopropylsilane triol homopolymer, N-(3-aminopropyl)-1-aminomethylsilane triol homopolymer, N-(3-aminopropyl)-2-aminomethylsilane triol homopolymer, N-(3-aminopropyl)-2-aminoisopropylsilane triol homopolymer, and N-(3-aminopropyl)-3-aminopropylsilane triol homopolymer.

Among these silicon resins, in particular, in the use as a silane coupling agent and a fiber treatment agent, from the viewpoint of improving adhesion to an organic material by reacting with a plurality of hydroxyl groups on the substrate surface, preferred are 1-aminomethylsilane triol homopolymer, 2-aminoethylsilane triol homopolymer, 2-aminoisopropylsilane triol homopolymer, 3-aminopropylsilane triol homopolymer, N-(1-aminomethyl)-1-aminomethylsilane triol homopolymer, N-(1-aminomethyl)-2-aminoethylsilane triol homopolymer, N-(1-aminomethyl)-2-aminoisopropylsilane triol homopolymer, N-(1-aminomethyl)-3-aminopropylsilane triol homopolymer, N-(2-aminoethyl)-1-aminomethylsilane triol homopolymer, N-(2-aminoethyl)-2-aminoethylsilane triol homopolymer, N-(2-aminoethyl)-2-aminoisopropylsilane triol homopolymer, N-(2-aminoethyl)-3-aminopropylsilane triol homopolymer, N-(2-aminoisopropyl)-1-aminomethylsilane triol homopolymer, N-(2-aminoisopropyl)-2-aminoethylsilane triol homopolymer, N-(2-aminoisopropyl)-2-aminomethylsilane triol homopolymer, N-(3-aminopropyl)-2-aminoisopropylsilane triol homopolymer, and N-(3-aminopropyl)-3-aminopropylsilane triol homopolymer.

The silicone resin (1) used in the present invention is a powdery solid.

A particle shape of the silicone resin (1) may be any shape such as a spherical shape, a polyhedral shape, a spindle shape, a needle shape, or a plate shape, and is preferably a spherical shape from the viewpoint of ease of handling. In the present invention, the spherical shape means that the particle shape does not mean only a true sphere but also includes an ellipsoid. The shape of the particle is confirmed by observing the particle with an optical microscope, an electron microscope, or the like.

A mean particle size of the silicone resin (1) is preferably 1 to 200 μm, more preferably 10 to 150 μm, and still more preferably 30 to 100 μm from the viewpoint of promotion of interaction with a carboxylic acid compound.

The mean particle size means a volume-based median diameter (D50) measured by a dry laser diffraction method. The volume-based median diameter is calculated by measuring a diameter corresponding to a 50% cumulative value of a volume-based cumulative particle size distribution curve under conditions of a dispersion pressure of 2 bar and a scattering intensity of 2 to 10% by a dry method according to Fraunhofer diffraction theory using a laser diffraction-type particle size distribution measuring apparatus Mastersizer 3000 (manufactured by Malvern Instruments).

A loose bulk density of the silicone resin (1) is preferably 0.2 to 0.9 g/mL, more preferably 0.25 to 0.9 g/mL, and still more preferably 0.3 to 0.9 g/mL from the viewpoint of promoting interaction with a carboxylic acid compound.

The bulk density is calculated by putting a powdery silicone resin in a 100 ml container whose mass has been measured in advance until the silicone resin overflows (at this time, vibration is not applied to the measurement container, and the sample is not compressed), leveling the powder raised from an upper end face of the container using a leveling plate, measuring the mass of the content, and calculating the mass per 1 mL.

The silicone resin (1) is usually produced by hydrolyzing an aminosilane compound having an alkoxysilyl group having the following general formula (2).

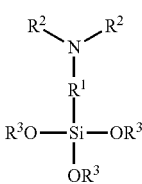

(2)

In the general formula (2), examples of $R^1$ and $R^2$ include the same ones as the substituents exemplified above. $R^3$ each independently represents a substituted or unsubstituted monovalent hydrocarbon group having 1 to 10 carbon atoms, preferably 1 to 6 carbon atoms, and more preferably 1 to 2 carbon atoms.

The monovalent hydrocarbon group of $R^3$ may be linear, branched, or cyclic, and specific examples thereof include linear alkyl groups such as methyl, ethyl, n-propyl, n-butyl, n-pentyl, n-hexyl, n-heptyl, n-octyl, n-nonyl, and n-decyl groups; branched alkyl groups such as sec-propyl, sec-butyl, tert-butyl, sec-pentyl, tert-pentyl, sec-hexyl, tert-hexyl, sec-heptyl, tert-heptyl, sec-octyl, tert-octyl, sec-nonyl, tert-nonyl, sec-decyl, and tert-decyl groups; cyclic alkyl groups such as cyclopentyl and cyclohexyl groups; alkenyl groups such as vinyl, allyl, butenyl, and methallyl groups; aryl groups such as phenyl, tolyl, and xylyl groups; and aralkyl groups such as benzyl and phenethyl groups.

Some or all of the hydrogen atoms of these monovalent hydrocarbon groups may be substituted with other substituents, and specific examples of this substituent include the same substituents as the substituents in the case where some or all of the hydrogen atoms of the divalent hydrocarbon group of $R^1$ may be substituted with other substituents, and one or two or more of these substituents may be used in combination. The substitution positions of these substituents are not particularly limited, and the number of substituents is also not limited.

Among them, $R^3$ is preferably an unsubstituted linear alkyl group having 1 to 6 carbon atoms, and more preferably a methyl group or an ethyl group, particularly from the viewpoint of availability.

Specific examples of the aminosilane compound having an alkoxysilyl group include trialkoxysilane compounds having a primary amino group, such as 1-aminomethyltrimethoxysilane, 1-aminomethyltriethoxysilane, 2-aminoethyltrimethoxysilane, 2-aminoethyltriethoxysilane, 2-aminoisopropyltrimethoxysilane, 2-aminoisopropyltriethoxysilane, 3-aminopropyltrimethoxysilane, and 3-aminopropyltriethoxysilane; trialkoxysilane compounds having a secondary amino group such as N-methyl-1-aminomethyltrimethoxysilane, N-methyl-1-aminomethyltriethoxysilane, N-methyl-2-aminoethyltrimethoxysilane, N-methyl-2-aminoethyltriethoxysilane, N-methyl-2-aminoisopropyltrimethoxysilane, N-methyl-2-aminoisopropyltriethoxysilane, N-methyl-3-aminopropyltrimethoxysilane, and N-methyl-3-aminopropyltriethoxysilane; trialkoxysilane compounds having a tertiary amino group such as N,N-dimethyl-1-aminomethyltrimethoxysilane, N,N-dimethyl-1-aminomethyltriethoxysilane, N,N-dimethyl-2-aminoethyltrimethoxysilane, N,N-dimethyl-2-aminoethyltriethoxysilane, N,N-dimethyl-2-aminoisopropyltrimethoxysilane, N,N-dimethyl-2-aminoisopropyltriethoxysilane, N,N-dimethyl-3-aminopropyltrimethoxysilane, and N,N-dimethyl-3-aminopropyltriethoxysilane; and trialkoxysilane compounds having a diamino group, such as N-(1-aminomethyl)-1-aminomethyltrimethoxysilane, N-(1-aminomethyl)-1-aminomethyltriethoxysilane, N-(1-aminomethyl)-2-aminoethyltrimethoxysilane, N-(1-aminomethyl)-2-aminoethyltriethoxysilane, N-(1-aminomethyl)-2-aminoisopropyltrimethoxysilane, N-(1-aminomethyl)-2-aminoisopropyltriethoxysilane, N-(1-aminomethyl)-3-aminopropyltrimethoxysilane, N-(1-aminomethyl)-3-aminopropyltriethoxysilane, N-(2-aminoethyl)-1-aminomethyltrimethoxysilane, N-(2-aminoethyl)-1-aminomethyltriethoxysilane, N-(2-aminoethyl)-2-aminoethyltrimethoxysilane, N-(2-aminoethyl)-2-aminoethyltriethoxysilane, N-(2-aminoethyl)-2-aminoisopropyltrimethoxysilane, N-(2-aminoethyl)-2-aminoisopropyltriethoxysilane, N-(2-aminoethyl)-3-aminopropyltrimethoxysilane, N-(2-aminoethyl)-3-aminopropyltriethoxysilane, N-(2-aminoisopropyl)-1-aminomethyltrimethoxysilane, N-(2-aminoisopropyl)-1-aminomethyltriethoxysilane, N-(2-aminoisopropyl)-2-aminoethyltrimethoxysilane, N-(2-aminoisopropyl)-2-aminoethyltriethoxysilane, N-(2-aminoisopropyl)-2-aminoisopropyltrimethoxysilane, N-(2-aminoisopropyl)-2-aminoisopropyltriethoxysilane, N-(2-aminoisopropyl)-3-aminopropyltrimethoxysilane, N-(2-aminoisopropyl)-3-aminopropyltriethoxysilane, N-(3-aminopropyl)-1-aminomethyltrimethoxysilane, N-(3-aminopropyl)-1-aminomethyltriethoxysilane, N-(3-aminomethyl)-1-aminomethyltrimethoxysilane, N-(3-aminomethyl)-1-aminomethyltriethoxysilane, N-(3-aminomethyl)-2-aminoethyltrimethoxysilane, N-(3-aminomethyl)-2-aminoethyltriethoxysilane, N-(3-aminomethyl)-2-aminoisopropyltrimethoxysilane, N-(3-aminomethyl)-2-aminoisopropyltriethoxysilane, N-(3-aminomethyl)-3-aminopropyltrimethoxysilane, N-(3-aminomethyl)-3-aminopropyltriethoxysilane, and N-(3-aminomethyl)-3-aminopropyltriethoxysilane.

Among these compounds, in particular, in the use as a silane coupling agent and a fiber treatment agent, from the viewpoint of improving the adhesion to an organic material by reacting with the plurality of hydroxyl groups on the substrate surface, preferred are 1-aminomethyltrimethoxysilane, 1-aminomethyltriethoxysilane, 2-aminoethyltrimethoxysilane, 2-aminoethyltriethoxysilane, 2-aminoisopropyltrimethoxysilane, 2-aminoisopropyltriethoxysilane, 3-aminopropyltrimethoxysilane, 3-aminopropyltriethoxysilane, N-(1-aminomethyl)-1-aminomethyltrimethoxysilane, N-(1-aminomethyl)-1-aminomethyltriethoxysilane, N-(1-aminomethyl)-2-aminoethyltrimethoxysilane, N-(1-aminomethyl)-2-aminoethyltriethoxysilane, N-(1-aminomethyl)-2-aminoisopropyltrimethoxysilane, N-(1-aminomethyl)-2-aminoisopropyltriethoxysilane, N-(1-aminomethyl)-3-aminopropyltrimethoxysilane, N-(1-aminomethyl)-3-aminopropyltriethoxysilane, N-(2-aminoethyl)-1-aminomethyltrimethoxysilane, N-(2-aminoethyl)-1-aminomethyltriethoxysilane, N-(2-aminoethyl)-2-aminoethyltrimethoxysilane, N-(2-aminoethyl)-2-aminoethyltriethoxysilane, N-(2-aminoethyl)-2-aminoisopropyltrimethoxysilane, N-(2-aminoethyl)-2-aminoisopropyltriethoxysilane, N-(2-aminoethyl)-3-aminopropyltrimethoxysilane, N-(2-aminoethyl)-3-aminopropyltriethoxysilane, N-(2-aminoisopropyl)-1-aminomethyltrimethoxysilane, N-(2-aminoisopropyl)-1-aminomethyltriethoxysilane, N-(2-aminoisopropyl)-2-aminoethyltrimethoxysilane, N-(2-aminoisopropyl)-2-aminoethyltriethoxysilane, N-(2-aminoisopropyl)-2-aminoisopropyltrimethoxysilane, N-(2-aminoisopropyl)-2-aminoisopropyltriethoxysilane, N-(2-aminoisopropyl)-3-aminopropyltrimethoxysilane, N-(2-aminoisopropyl)-3-aminopropyltriethoxysilane, N-(3-aminopropyl)-1-aminomethyltrimethoxysilane, N-(3-aminopropyl)-1-aminomethyltriethoxysilane, N-(3- aminopropyl)-2-aminoethyltrimethoxysilane, N-(3-aminopropyl)-2-aminoethyltriethoxysilane, N-(3-aminopropyl)-2-aminoisopropyltrimethoxysilane, N-(3-aminopropyl)-2-aminoisopropyltriethoxysilane, N-(3-aminopropyl)-3-aminopropyltrimethoxysilane, and N-(3-aminopropyl)-3-aminopropyltriethoxysilane.

In the hydrolysis of the aminosilane compound having an alkoxysilyl group, a considerable amount of alcohol is generated corresponding to the alkoxysilyl group. Water may be contained depending on an added amount of water used for hydrolysis.

As described above, since the organopolysiloxane composition of the present invention is a uniform and transparent solution in which the silicone resin (1) is dissolved in an aprotic solvent, from the viewpoint of compatibility with the aprotic solvent, the silicone resin (1) is preferably obtained by removing alcohol and water from a hydrolysis liquid.

A method of removing alcohol and water from the hydrolysis liquid is not particularly limited, and removal methods such as centrifugation, heat drying, chromatography, recrystallization, distillation, extraction, decantation, liquid separation, and filtration can be adopted. Among these methods, heat drying is preferable from the viewpoint of productivity.

Specific examples of a method of producing a powdery silicone resin include a method of heating and pulverizing a standing hydrolysis liquid, a method of heating, stirring and flowing the hydrolysis liquid, a spray drying method (spray drying method) of spraying and dispersing the hydrolysis liquid in a high-temperature airflow such as a spray dryer, and a method using a fluid heating medium.

The spray drying method is a granulation method in which a solution containing a solid and a solvent is decomposed (sprayed) into small droplets and brought into contact with a high-temperature airflow in a drying chamber to instantaneously evaporate the solvent, thereby obtaining a powdery solid (particles).

A driving force for evaporation of the solvent is generally obtained by setting a partial pressure of the solvent to be lower than a vapor pressure of the solvent at a temperature at which droplets are dried. Preferred embodiments include a method of mixing droplets with a high-temperature dry gas, a method of maintaining a pressure in a solvent removal apparatus in an incomplete vacuum, and other methods.

In the case of pressurization at the time of spraying, it is possible to spray at a wide range of pressures. In the case of pressurization at the time of spraying, it is possible to spray at a wide range of pressures. In general, an evaporation rate of the solvent increases as a specific surface area of the droplets increases.

Thus, a diameter of the droplets to be sprayed is preferably less than 500 μm, more preferably less than 400 μm, and still more preferably 5 to 200 μm. The flow rates, temperatures, and pressures that enable such spraying are preferred.

A solution feed flow rate is preferably 1 to 500 kg/h, more preferably 5 to 100 kg/h, and still more preferably 10 to 50 kg/h.

A drying chamber inlet temperature is preferably 100 to 250° C., more preferably 110 to 220° C., and still more preferably 120 to 200° C.

A drying chamber outlet temperature is preferably 0 to 100° C., more preferably 0 to 95° C., and still more preferably 0 to 90° C.

A solution supply pressure is preferably 100 to 50,000 kPa, more preferably 200 to 10,000 kPa, and still more preferably 300 to 5,000 kPa.

When a method of heating and pulverizing a standing hydrolysis liquid using a vacuum dryer or the like is adopted as the method of producing a powdery silicone resin, a solvent and moisture remain; and therefore, in the use as a silane coupling agent and a fiber treatment agent, adhesion to an organic-inorganic composite material is deteriorated.

On the other hand, in the spray drying method, since the specific surface area of the sprayed particles is extremely large, the solvent and moisture are efficiently evaporated and removed. Thus, the contents of the solvent and moisture are reduced as compared with a case where the silicone resin is powderized by another method, and therefore the powdery silicone resin produced by the spray drying method has an advantage of excellent adhesion to the organic-inorganic composite material. Therefore, the silicone resin used in the present invention is preferably spray-dried particles obtained by the spray drying method from the viewpoint of controlling the contents of the solvent and moisture, and the like, and controlling physical properties such as the mean particle size and the bulk density.

When the silicone resin (1) is used as a silane coupling agent or a fiber treatment agent, the content of the silicone resin (1) in the organopolysiloxane composition is not particularly limited as long as it is an amount that enhances the adhesion by reacting with the plurality of hydroxyl groups on the substrate surface, and is preferably 0.001 to 99 wt %, more preferably 0.01 to 50 wt %, and still more preferably 0.1 to 10 wt % with respect to the organopolysiloxane composition from the viewpoint of the productivity.

The carboxylic acid compound used in the organopolysiloxane composition of the present invention is not particularly limited, and the carboxylic acid compound is preferably one kind or two or more kinds selected from a saturated monocarboxylic acid compound having 1 to 11 carbon atoms and an unsaturated monocarboxylic oxide having 3 to 22 carbon atoms.

Specific examples thereof include saturated monocarboxylic acid compounds having 1 to 11 carbon atoms, such as formic acid, acetic acid, propionic acid, butyric acid, valeric acid, caproic acid, enanthic acid, caprylic acid, pelargonic acid, capric acid, and undecylic acid; and unsaturated monocarboxylic acid compounds having 3 to 22 carbon atoms, such as acrylic acid, methacrylic acid, isocrotonic acid, pentenoic acid, hexenoic acid, heptenoic acid, octenoic acid, nonenoic acid, decenoic acid, undecenoic acid, dodecenoic acid, tridecenoic acid, tetradecenoic acid, myristoleic acid, pentadecenoic acid, hexadecenoic acid, hexadecadienoic acid, hexadecatrienoic acid, hexadecatetraenoic acid, palmitoleic acid, sapienic acid, heptadecenoic acid, heptadecadienoic acid, heptadecatrienoic acid, heptadecatetraenoic acid, octadecenoic acid, octadecadienoic acid, octadecatrienoic acid, octadecatetraenoic acid, oleic acid, ricinoleic acid, vaccenic acid, linoleic acid, linolenic acid, nonadecenoic acid, nonadecadienoic acid, nonadecatrienoic acid, nonadecatetraenoic acid, eicosenoic acid, eicosadienoic acid, eicosatrienoic acid, eicosatetraenoic acid, eicosapentaenoic acid, gadoleic acid, arachidonic acid, docosenoic acid, docosadienoic acid, docosatrienoic acid, docosatetraenoic acid, docosahexaenoic acid, and erucic acid, and these carboxylic acid compounds may be used alone or in combination of two or more thereof.

In the organopolysiloxane composition of the present invention, a natural oil containing these carboxylic acid compounds may be used.

Specific examples of the natural oil include almond oil, *Astrocaryum murumuru* seed butter, avocado oil, camelina seed oil, linseed oil, arganiaspinosa kernel oil, apricot kernel oil, olive fruit oil, cacao butter, *rosa canina* fruit oil, canola oil, apricot kernel oil, kukui nut oil, black current seed oil, corn oil, sesame oil, wheat germ oil, rice bran oil, rice germ oil, pomegranate seed oil, safflower oil, shea fat, sclerocarya *birrea* seed oil, soybean oil, *Camellia sinensis* seed oil, evening primrose oil, *camellia japonica* seed oil, *theobroma grandiflorum* seed fat, palm kernel fatty acid, palm kernel oil, palm oil, horse oil, hybrid safflower oil, hybrid sunflower oil, peanut oil, pistachio seed oil, castor oil, sunflower seed oil, grape seed oil, hazelnut seed oil, *jojoba* seed oil, macadamia seed oil, mango seed oil, meadowfoam oil, Japan wax, peach kernel oil, coconut fatty acid, coconut oil, *arachis* oil, *Borago officinalis* seed oil, rose hip oil, and *moringa oleifera* seed oil.

Among these oils, particularly from the viewpoint of availability, preferred are formic acid, acetic acid, propionic acid, butyric acid, valeric acid, caproic acid, enanthic acid, caprylic acid, pelargonic acid, capric acid, undecylic acid, acrylic acid, methacrylic acid, isocrotonic acid, pentenoic acid, hexenoic acid, heptenoic acid, octenoic acid, nonenoic acid, decenoic acid, undecenoic acid, dodecenoic acid, tridecenoic acid, tetradecenoic acid, myristoleic acid, pentadecenoic acid, hexadecenoic acid, hexadecadienoic acid, hexadecatrienoic acid, hexadecatetraenoic acid, palmitoleic acid, sapienic acid, heptadecenoic acid, heptadecadienoic acid, heptadecatrienoic acid, heptadecatetraenoic acid, octadecenoic acid, octadecadienoic acid, octadecatrienoic acid, octadecatetraenoic acid, oleic acid, ricinoleic acid, vaccenic acid, linoleic acid, linolenic acid, nonadecenoic acid, nonadecadienoic acid, nonadecatrienoic acid, nonadecatetraenoic acid, eicosenoic acid, eicosadienoic acid, eicosatrienoic acid, eicosatetraenoic acid, eicosapentaenoic acid, gadoleic acid, arachidonic acid, docosenoic acid, docosadienoic acid, docosatrienoic acid, docosatetraenoic acid, docosahexaenoic acid, and erucic acid, and more preferred are butyric acid, valeric acid, caproic acid, enanthic acid, caprylic acid, pelargonic acid, capric acid, undecylic acid, oleic acid, ricinoleic acid, linoleic acid, linolenic acid, arachidonic acid, eicosapentaenoic acid, and docosahexaenoic acid.

The carboxylic acid compound interacts with the silicone resin (1). Specifically, the carboxyl group of the carboxylic acid compound reacts with the amino group of the silicone resin (1) to form a salt or amide bond, and also reacts with the silanol group to form an ester bond. In the silicone resin (1) in which the salt, the amide bond, or the ester bond is formed, hydrophobicity is improved by the hydrocarbon group of the carboxylic acid compound, and therefore compatibility with the aprotic solvent is improved.

As described above, since the organopolysiloxane composition of the present invention is the uniform and transparent solution in which the silicone resin (1) is dissolved in the aprotic solvent, from the viewpoint of compatibility with the aprotic solvent, as the carboxylic acid compound, it is preferable to use a monocarboxylic acid compound that does not form a crosslinked structure. From the viewpoint of promoting interaction with the silicone resin (1), it is preferable to use a liquid monocarboxylic acid compound compatible with the aprotic solvent.

The content of the carboxylic acid compound in the organopolysiloxane composition is not particularly limited as long as it is an amount that the organopolysiloxane composition becomes a uniform and transparent solution, and from the viewpoint of productivity, the content is preferably 0.001 to 99 wt %, more preferably 0.01 to 50 wt %, and still more preferably 0.1 to 10 wt % with respect to the organopolysiloxane composition.

Specific examples of the aprotic solvent used in the organopolysiloxane composition of the present invention include saturated aliphatic hydrocarbon-based solvents such as pentane, isopentane, cyclopentane, hexane, isohexane, cyclohexane, heptane, isoheptane, octane, isooctane, nonane, isononane, decane, isodecane, dodecane, isododecane, tetradecane, isotetradecane, hexadecane, isohexadecane, octadecane, isooctadecane, eicosane, isoeicosane, liquid paraffin, liquid isoparaffin, and squalane; unsaturated aliphatic hydrocarbon-based solvents such as pentene, hexene, heptene, octene, nonene, decene, undecene, dodecene, tridecene, tetradecene, pentadecene, hexadecene, heptadecene, octadecene, nonadecene, eicosene, and squalane; aromatic hydrocarbon-based solvents such as benzene, toluene, xylene, ethylbenzene, mesitylene, styrene, and tetralin; ketone-based solvents such as acetone and methyl isobutyl ketone; ether-based solvents such as diethyl ether, tetrahydrofuran, and dioxane; ester-based solvents such as ethyl acetate and butyl acetate; aprotic polar solvents such as acetonitrile and N,N-dimethylformamide; and chlorinated hydrocarbon-based solvents such as dichloromethane and chloroform, and these solvents may be used alone or in combination of two or more thereof.

Among these solvents, particularly from the viewpoint of compatibility with a hydrophobic organic material and a hydrophobic inorganic material, one or two or more selected from the saturated aliphatic hydrocarbon-based solvent, the unsaturated aliphatic hydrocarbon-based solvent, the aromatic hydrocarbon-based solvent, and the ketone-based solvent are preferable, and one or two or more selected from the saturated aliphatic hydrocarbon-based solvent and the aromatic hydrocarbon-based solvent are more preferable.

The content of the aprotic solvent in the organopolysiloxane composition is not particularly limited as long as it is an amount that the organopolysiloxane composition becomes a uniform and transparent solution, and from the viewpoint of productivity, the content is preferably 1 to 99 wt %, more preferably 10 to 90 wt %, and still more preferably 20 to 80 wt % with respect to the organopolysiloxane composition.

The organopolysiloxane composition of the present invention is composed only of the silicone resin (1), a carboxylic acid compound or a natural oil containing the carboxylic acid compound, and an aprotic solvent, and forms a uniform and transparent solution in which precipitation of a solid or separation of a liquid does not occur.

The method of producing the organopolysiloxane composition is not particularly limited as long as the silicone resin (1) is dissolved in an aprotic solvent, and may be any of a method of adding the silicone resin (1) to a solution containing a carboxylic acid compound and an aprotic solvent, a method of adding a solution containing the silicone resin (1) and a carboxylic acid compound to an aprotic solvent, a method of adding a solution containing the silicone resin (1) and an aprotic solvent to a carboxylic acid compound, a method of adding a carboxylic acid compound to a solution containing the silicone resin (1) and an aprotic solvent, a method of adding a solution containing a carboxylic acid compound and an aprotic solvent to the silicone resin (1), a method of adding an aprotic solvent to a solution containing the silicone resin (1) and a carboxylic acid compound, and a method of simultaneously mixing the silicone resin (1) with the carboxylic acid compound and the aprotic solvent, and from the viewpoint of productivity, the method of simultaneously mixing the silicone resin (1) with the carboxylic acid compound and the aprotic solvent is preferable.

A mixing temperature is preferably 20 to 100° C., more preferably 20 to 60° C., and still more preferably 20 to 40° C. from the viewpoint of productivity.

A mixing time is preferably 1 to 72 hours, more preferably 1 to 48 hours, and still more preferably 1 to 24 hours from the viewpoint of productivity, and may be appropriately set in relation to the preparation temperature.

As described above, the organopolysiloxane composition of the present invention is a uniform and transparent composition composed of three components including the silicone resin (1), the carboxylic acid compound or the natural oil containing the carboxylic acid compound, and the aprotic solvent, and the organopolysiloxane composition can be used for various uses by adding other additives.

In this case, the composition to which other additives are added may be uniform and transparent similarly to the organopolysiloxane composition of the present invention, or as a result of adding other additives, the composition may become non-uniform and opaque, or precipitation of a solid or separation of a liquid may occur.

Examples of the other additives include solid, semi-solid, or liquid oils, water, alcohols, water-soluble polymers, film-forming agents, surfactants, oil-soluble gelling agents, organic modified clay minerals, powders, antiperspirants, ultraviolet absorbers, ultraviolet absorbing and scattering agents, moisture retention agents, preservatives, antibacterial agents, fragrances, salts, antioxidants, pH adjusting agents, chelating agents, refreshing agents, anti-inflammatory agents, skin beautifying components (such as skin whitener, cell activator, rough dry skin improver, blood circulation promoter, skin astringent, and anti-seborrheic agent), vitamins, amino acids, nucleic acids, hormones, clathrate compounds, and hair setting agents, which are used in normal cosmetics.

Specific examples of the additive will be described below, but the present invention is not limited thereto.

Examples of the solid, semi-solid, or liquid oil agent include hydrocarbon oil, higher alcohol, ester oil, glyceride oil, silicone oil, and fluorine-based oil agent.

Examples of the hydrocarbon oil include ozokerite, α-olefin oligomers, light isoparaffins, isododecane, isohexadecane, light liquid isoparaffins, squalane, synthetic squalane, vegetable squalane, squalene, ceresin, paraffin, paraffin wax, polyethylene wax, polyethylene-polypropylene wax, (ethylene-propylene-styrene) copolymers, (butylene-propylene-styrene) copolymers, liquid paraffin, liquid isoparaffin, pristane, polyisobutylene, hydrogenated polyisobutene, microcrystalline wax, and petrolatum.

Examples of the higher alcohol include lauryl alcohol, myristyl alcohol, palmityl alcohol, stearyl alcohol, behenyl alcohol, hexadecyl alcohol, oleyl alcohol, isostearyl alcohol, hexyldodecanol, octyldodecanol, cetostearyl alcohol, 2-decyltetradecinol, cholesterol, phytosterol, POE cholesterol ether, monostearyl glycerin ether (butyl alcohol), and monooleyl glyceryl ether (ceracil alcohol).

Examples of the ester oil include di-isobutyl adipate, 2-hexyldecyl adipate, di-2-heptylundecyl adipate, N-alkyl glycol monoisostearate, isocetyl isostearate, trimethylolpropane triisostearate, ethylene glycol di-2-ethylhexanoate, cetyl 2-ethylhexanoate, trimethylolpropane tri-2-ethylhexanoate, pentaerithritol tetra-2-ethylhexanoate, cetyl octanoate, octyldodecyl gum ester, oleyl oleate, octyldodecyl oleate, decyl oleate, neopentyl glycol dioctanoate, neopentyl glycol dicaproate, triethyl citrate, 2-ethylhexyl succinate, amyl acetate, ethyl acetate, butyl acetate, isocetyl stearate, butyl stearate, diisopropyl sebacate, di-2-ethylhexyl sebacate, cetyl lactate, myristyl lactate, isononyl isononanoate, isotridecyl isononanoate, isopropyl palmitate, 2-ethylhexyl palmitate, 2-hexyldecyl palmitate, 2-heptylundecyl palmitate, cholesteryl 12-hydroxystearate, dipentaerythritol fatty acid ester, isopropyl myristate, octyldodecyl myristate, 2-hexyldecyl myristate, myristyl myristate, hexyldecyl dimethyl octanoate, ethyl laurate, hexyl laurate, N-lauroyl-L-glutamic acid-2-octyldodecyl ester, lauroyl sarcosine isopropyl ester, and diisostearyl malate.

Examples of the glyceride oil include acetoglyceryl, glyceryl triisocotanoate, glyceryl triisostearate, glyceryl triisopalmitate, glyceryl tribehenate, glyceryl monostearate, glyceryl di-2-heptylundecanoate, glyceryl trimvristate, and diglyceryl myristate isostearate.

Examples of the silicone oil include straight-chain or branched organopolysiloxane having a low viscosity to a high viscosity, such as dimethylpolysiloxane, tristrimethylsiloxymethyl silane, caprylyl methicone, phenyl trimethicone, tetrakistrimethylsiloxysilane, methyl phenylpolysiloxane, methylhexylpolysiloxane, methyl hydrogen polysiloxane, and dimethylsiloxane-methylphenyl siloxane copolymer; cyclic organopolysiloxanes such as octamethyl cyclotetrasiloxane, decamethylcyclopentasiloxane, dodecamethylcyclohexasiloxane, tetramethyl tetrahydrogen cyclotetrasiloxane, and tetramethyl tetraphenyl cyclotetrasiloxane; amino-modified organopolysiloxane, pyrrolidone-modified organopolysiloxane, pyrrolidone carboxylic acid-modified organopolysiloxane, silicone rubbers such as gum-like dimethyl polysiloxane having a high polymerization degree, gum amino-modified organopolysiloxane, and gum dimethylsiloxane-methylphenylsiloxane copolymer, silicone gum and cyclic organopolysiloxane gum solution; higher alkoxy-modified silicones such as stearoxysilicone; higher fatty acid-modified silicone, alkyl-modified silicone, long-chain alkyl-modified silicone, amino acid-modified silicone, and fluorine-modified silicone.

Examples of the fluorine-based oil agent include perfluoropolyether, perfluorodecalin, and perfluorooctane.

Examples of the alcohols include lower alcohols such as ethanol and isopropanol; sugar alcohols such as sorbitol and maltose; sterols such as cholesterol, sitosterol, phytosterol, and lanosterol; and polyhydric alcohols such as butylene glycol, propylene glycol, dibutylene glycol, and pentylene glycol.

Examples of the water-soluble polymer include plant-based polymers such as gum arabic, tragacanth, galactan, carob gum, guar gum, karaya gum, carrageenan, pectin, agar, quince seed (quince), starch (rice, corn, potato, wheat), argecolloid, trant gum, and locust bean gum; microorganism-based polymers such as xanthane gum, dextran, succinoglucan, and pullulan; animal-based polymers such as collagen, casein, albumin, and gelatin; starch-based polymers such as carboxymethyl starch and methylhydroxypropyl starch; cellulose-based polymers such as methyl cellulose, ethyl cellulose, methylhydroxypropyl cellulose, carboxymethyl cellulose, hydroxymethyl cellulose, hydroxypropyl cellulose, nitrocellulose, sodium cellulose sulfate, sodium carboxymethyl cellulose, crystalline cellulose, and cellulose powder; alginic acid-based polymers such as sodium alginate and alginic acid propylene glycol ester; vinyl-based polymers such as polyvinylmethyl ether and carboxyvinyl polymer; polyoxyethylene-based polymers; polyoxyethylene-polyoxypropylene compolymers; acrylic polymers such as sodium polyacrylate, polyethyl acrylate, polyacrylamide, acryloyldimethyl taurin salt copolymer; synthetic water-soluble polymers such as polyethylene imine and cation polymer; and inorganic water-soluble polymers such as bentonite, magnesium aluminum silicate, montmorillonite, beidellite, nontronite, saponite, hectorite, and silicic anhydride.

Examples of the film-forming agent include latexes such as polyvinyl alcohol, polyvinylpyrrolidone, polyvinyl acetate, and polyalkyl acrylate; cellulose derivatives such as dextrin, alkyl cellulose, and nitrocellulose; siliconized polysaccharides such as pullulan tris(trimethylsiloxy)silylpropylcarbamate; acrylic-silicone graft copolymers such as (alkyl acrylate/dimethicone) copolymers; silicone resins such as trimethylsiloxysilicate; silicone-based resins such as silicone-modified polynorbomene and fluorine-modified silicone resins; fluorinated resins, aromatic hydrocarbon resins, polymer emulsion resins, terpene-based resins, polybutene, polyisoprene, alkyd resins, polyvinylpyrrolidone-modified polymers, rosin-modified resins, and polyurethanes.

Examples of the surfactant include anionic surfactants such as fatty acid soaps such as sodium stearate and triethanolamine palmitate; alkylether carboxylic acids and salts thereof, salts of condensates of amino acids with fatty acids; alkanesulfonates, alkenesulfonates, sulfonates of fatty acid esters, fatty acid amide sulfonates, sulfonates of formalin condensates, alkylsulfates, sulfates of secondary higher alcohols, alkyl/allyl ether sulfates, sulfates of fatty acid esters, sulfates of fatty acid alkylolamides, and sulfates of Turkey Red oil; and alkyl phosphates, ether phosphates, alkylallylether phosphates, amide phosphates, N-acyl lactate, N-acyl sarcosinate and N-acylamino acid activates; cationic surfactants such as alkylamine salts, amine salts of polyamine and amino alcohol fatty acid derivatives, alkyl quaternary ammonium salts, aromatic quaternary ammonium salts, pyridinium salts, and imidazolium salts; nonionic surfactants such as sorbitan fatty acid esters, glycerin fatty acid esters, polyglycerin fatty acid esters, propylene glycol fatty acid esters, polyethylene glycol fatty acid esters, sucrose fatty acid esters, methylglucoside fatty acid esters, alkylpolyglucoside, polyoxyethylene alkylethers, polyoxypropylene alkylethers, polyoxyethylene alkylphenylethers, polyoxyethylene fatty acid esters, polyoxyethylene sorbitan fatty acid esters, polyoxyethylene sorbitol fatty acid esters, polyoxyethylene glycerin fatty acid esters, polyoxyethylene propylene glycol fatty acid esters, polyoxyethylene castor oil, polyoxyethylene hydrogenated castor oil, polyoxyethylene phytostanolether, polyoxyethylene phytosterolether, polyoxyethylene cholestanolether, polyoxyethylene cholesterylether, linear or branched polyoxyalkylene-modified organopolysiloxane, linear or branched polyoxyalkylene/alkyl co-modified-organopolysiloxane, linear or branched polyglycerin-modified organopolysiloxane, linear or branched polyglycerin/alkyl co-modified-organopolysiloxane, alkanolamide, sugar ethers, and sugar amides; and amphoteric surfactants such as betaine, phosphatidylcholine, aminocarboxylates, imidazoline derivatives, and amide or amine type surfactants.

Examples of the oil-soluble gelling agent include metal soaps such as aluminum stearate, magnesium stearate, and zinc myristate; amino acid derivatives such as N-lauroyl-L-glutamic acid and α,γ-di-n-butylamine; dextrin fatty acid esters such as dextrin palmitic acid ester, dextrin stearic acid ester, and dextrin 2-ethylhexanoate/palmitate ester; sucrose fatty acid esters such as sucrose palmitic acid ester and sucrose stearic acid ester; fructooligosaccharide fatty acid esters such as fructooligosaccharide stearate ester and fructooligosaccharide 2-ethylhexanoate ester; and benzylidene derivatives of sorbitol such as monobenzylidene sorbitol and dibenzylidene sorbitol.

Examples of the organically modified clay mineral include dimethylbenzyl dodecylammonium montmorillonite clay and dimethyl dioctadecylammonium montmorillonite clay.

Examples of the powder include powders used for ordinary cosmetic preparations, the powder may have any form (spheroidal, acicular, tabular), particle diameter (fume, fine particle, pigment) or particle structure (porous, non-porous), and examples thereof include inorganic powders, organic powders, surfactant metal salt powders, colored pigments, pearl pigments, metal powder pigments, tar pigments, and natural pigments.

Examples of the inorganic powder include titanium oxide, zirconium oxide, zinc oxide, cerium oxide, magnesium oxide, barium sulfate, calcium sulfate, magnesium sulfate, calcium carbonate, magnesium carbonate, talc, mica, kaolin, sericite, white mica, synthetic mica, gold mica, red mica, black mica, lithia mica, silicic acid, silicic anhydride, aluminum silicate, magnesium silicate, aluminum magnesium silicate, calcium silicate, barium silicate, strontium silicate, metal salt of tungstic acid, hydroxyapatite, vermiculite, hydilite, bentonite, montmorillonite, hectorite, zeolite, ceramic powder, dicalcium phosphate, alumina, aluminum hydroxide, boron nitride, boron nitride, and silica.

Examples of the organic powder include polyamide powder, polyester powder, polyethylene powder, polypropylene powder, polystyrene powder, polyurethane powder, benzoguanamine powder, polymethyl benzoguanamine powder, polytetrafluoroethylene powder, polymethyl methacrylate powder, cellulose, silk powder, nylon powder, 12 nylon, 6 nylon, silicon powder, styrene-acrylate copolymer, divinyl benzene-styrene copolymer, vinyl resin, urea resin, phenol resin, fluororesin, silicic resin, microcrystal fiber powder, starch powder, and lauroyl lysine.

Examples of the surfactant metal salt powder (metallic soap) include zinc stearate, aluminum stearate, calcium stearate, magnesium stearate, zinc myristate, magnesium myristate, zinc cetyl phosphate, calcium cetyl phosphate, and zinc sodium cetyl phosphate.

Examples of the colored pigment include inorganic red pigments such as iron oxide, iron hydroxide, and iron titanate; inorganic brown pigments such as γ-iron oxide; inorganic yellow pigments such as yellow iron oxide and yellow ocher; inorganic black pigments such as black iron oxide and carbon black; inorganic purple pigments such as manganese violet and cobalt violet; inorganic green pigments such as chromium hydroxide, chromium oxide, cobalt oxide, and cobalt titanate; inorganic blue pigments such as deep blue and navy blue; laked tar dyes; laked natural dyes; and synthetic resin powders combining powders of the foregoing.

Examples of the pearl pigment include titanium-oxide coated mica, titanium-oxide coated mica, bismuth oxychloride, titanium-oxide coated bismuth oxychloride, titanium-oxide coated talc, scale foil, and titanium-oxide coated colored mica.

Examples of the metal powder pigment include aluminum powder, copper powder, and stainless steel powder.

Examples of the tar dye include red 3, red 104, red 106, red 201, red 202, red 204, red 205, red 220, red 226, red 227, red 228, red 230, red 401, red 505, yellow 4, yellow 5, yellow 202, yellow 203, yellow 204, yellow 401, blue 1, blue 2, blue 201, blue 404, green 3, green 201, green 204, green 205, orange 201, orange 203, orange 204, orange 206, and orange 207.

Examples of the natural dye include carmic acid, arachic acid, carsamine, bradyline, and crocin.

As these powders, those in which powders are compounded, or those treated with general oil, silicone oil, a fluorine compound, a surfactant, etc., may be also used, and one kind or two or more kinds of those treated with a hydrolyzable silyl group or an alkyl group having a hydrogen atom directly bonded to a silicon atom, a linear and/or branched organopolysiloxane having a hydrolyzable silyl group or a hydrogen atom directly bonded to a silicon atom, a linear and/or branched organopolysiloxane having a hydrolyzable silyl group or a hydrogen atom directly bonded to a silicon atom and being co-modified by a long chain alkyl, a linear and/or branched organopolysiloxane having a hydrolyzable silyl group or a hydrogen atom directly bonded to a silicon atom and being co-modified by polyoxyalkylene, an acrylic-silicone-based copolymer having a hydrolyzable silyl group or a hydrogen atom directly bonded to a silicon atom, etc., may be also used depending on necessity.

Examples of the antiperspirant include aluminum chlorohydrate, aluminum chloride, aluminum sesquichlorohydrate, zirconium hydroxychloride, aluminum zirconium hydroxychloride and aluminum zirconium glycine complex.

Examples of the ultraviolet absorber include benzoic acid-based ultraviolet absorbers such as paraaminobenzoic acid; anthranilic acid-based ultraviolet absorbers such as methyl anthranilate; salicylic acid-based ultraviolet absorbers such as methyl salicylate, octyl salicylate, and trimethylcyclohexyl salicylate; cinnamic acid-based ultraviolet absorbers such as octyl para methoxy cinnamate; benzophenone-based ultraviolet absorbers such as 2,4-dihydroxybenzophenon; urocanic acid-based ultraviolet absorbers such as ethyl urocanate; dibenzoyl methane-based ultraviolet absorbers such as 4-t-butyl-4'-methoxy-dibenzoyl methane; phenylbenzoyl imidazole sulfonic acid, and triazine derivatives.

Examples of the ultraviolet absorbing and scattering agents include powder which absorbs and scatters ultraviolet rays such as fine particulate titanium oxide, fine particulate iron-containing titanium oxide, fine particulate zinc oxide, fine particulate cerium oxide, and a complex thereof, and a dispersion in which these powders which absorb and scatter ultraviolet rays are dispersed in oil in advance can be also used.

Examples of the moisture retention agents include glycerin, sorbitol, propylene glycol, dipropylene glycol, 1,3-butylene glycol, pentylene glycol, glucose, xylitol, maltitol, polyethylene glycol, hyaluronic acid, chondroitin sulfate, pyrolidone carboxylic acid salt, polyoxyethylene methyl glucoside, polyoxypropylene methyl glucoside, yolk lecithin, soy lecithin, phosphatidylcholine, phosphatidylethanolamine, phosphatidyl serine, phosphatidyl glycerol, phosphatidylinositol, and sphingo phospholipid.

Examples of the preservatives and the antibacterial agents include para-oxybenzoate alkyl ester, benzoic acid, sodium benzoate, sorbic acid, potassium sorbate, phenoxy ethanol, imidazolidinyl urea, salicylic acid, isopropylmethylphenol, phenol, p-chloro-m-cresol, hexachlorophene, benzalkonium chloride, chlorhexidine chloride, trichlorocarbanilide, iodopropynyl butylcarbamate, polylysine, photosensitizers, silver, and plant extracts.

Examples of the fragrance include natural and synthetic fragrances.

Examples of the natural fragrances include vegetable fragrances isolated from flowers, leaves, branches, fruit skin, and the like; and animal fragrances such as musk and civet.

Examples of the synthetic fragrances include hydrocarbons such as monoterpene; alcohols such as aliphatic alcohol and aromatic alcohol; aldehydes such as terpene aldehyde and aromatic aldehyde; ketones such as alicyclic ketone; esters such as terpene-based ester; lactones; phenols; oxides; nitrogen containing compounds; and acetals.

Examples of the salts include inorganic salts, organic acid salts, amine salts, and amino acid salts.

Examples of the inorganic salt include sodium salts, potassium salts, magnesium salts, calcium salts, aluminum salts, zirconium salts, and zinc salts of inorganic acids such as hydrochloric acid, sulfuric acid, carbonic acid, and nitric acid.

Examples of the organic acid salt include salts of organic acids such as acetic acid, dehydroacetic acid, citric acid, malic acid, succinic acid, ascorbic acid, and stearic acid.

Examples of the amine salt and the amino acid salt include salts of amines such as triethanolamine and salts of amino acids such as glutamic acid. In addition, hyaluronic acid, chondroitin sulfate and similar salts, and neutralized salts of acid-alkali as used in preparation formulations may be used.

Examples of the antioxidant include carotenoid, ascorbic acid and salts thereof, ascorbyl stearate, tocophenol, tocophenol acetate, tocopherol, p-t-butylphenol, butylhydroxyanisole, dibutylhydroxytoluene, phytic acid, ferulic acid, thiotaurine, hypotaurine, sulfites, erythorbic acid and salts thereof, chlorogenic acid, epicatechin, epigallocatechin, epigallocatechin gallate, apigenin, kaempferol, myricetin, and quercetin.

Examples of the pH adjusting agent include potassium carbonate, sodium hydrogencarbonate, and ammonium hydrogencarbonate.

Examples of the chelating agent include alanine, sodium salt of EDTA, sodium polyphosphate, sodium metaphosphate, and phosphoric acid.

Examples of the refreshing agent include L-menthol, camphor, and menthyl lactate.

Examples of the anti-inflammatory agent include arantoin, glycyrrhizic acid and salts thereof, glycyrrhetinic acid, stearyl glycyrrhetinate, tranexamic acid, and azulene.

Example of the skin beautifying component include brightening agents such as placenta extract, arbutin, glutathione, and Saxifrage *stolonifera* extract; cell activating agents such as royal jelly, photosensitizer, cholesterol derivatives, and bovine blood extract; anti-skin-roughening agents; blood flow promotors such as nonanoic acid vanillylamide, benzyl nicotinate, β-butoxyethyl nicotinate, capsaicin, zingerone, cantharides tincture, ichthammol, caffeine, tannic acid, α-borneol, nicotinic acid tocopherol, inositol hexanicotinate, cyclandelate, cinnarizine, tolazoline, acetylcholine, verapamil, cepharanthine, and γ-oryzanol; skin astringents such as zinc oxide and tannic acid; and antiseborrheic agents such as sulfur and thianthrol.

Examples of the vitamins include vitamin A species such as vitamin A oil, retinol, retinol acetate, and retinol palmitate; vitamin B species, for example, vitamin B2 species such as riboflavin, riboflavin butyrate, and flavin adenine nucleotide, vitamin B6 species such as pyridoxine hydrochloride, pyridoxine dioctanoate, and pyridoxine tripalmitate, vitamin B12 and derivatives thereof, vitamin B15 and derivatives thereof; vitamin C species such as L-ascorbic acid, L-ascorbic acid dipalmitic acid ester, sodium L-ascorbic acid-2-sulfate, and dipotassium L-ascorbic acid phosphoric acid diester; vitamin D species such as ergocalciferol and cholecalciferol; vitamin E species such as α-tocopherol, β-tocopherol, γ-tocopherol, dl-α-tocopherol acetate, dl-α-tocopherol nicotinate, and dl-α-tocopherol succinate; nicotinic acids such as nicotinic acid, benzyl nicotinate and nicotinic acid amide; vitamin H; vitamin P; pantothenic acids such as calcium pantothenate, D-pantothenyl alcohol, pantothenyl ethyl ether, and acetylpantothenyl ethyl ether, and biotin.

Examples of the amino acids include glycine, valine, leucine, isoleucine, serine, threonine, phenylalanine, arginine, lysine, aspartic acid, glutamic acid, cystine, cysteine, methionine, and tryptophan.

Examples of the nucleic acid include deoxyribonucleic acid.

Examples of the hormone include estradiol and ethenylestradiol.

Examples of the clathrate compound include cyclodextrin.

The hair setting agent can include amphoteric, anionic, cationic or nonionic high-molecular compounds. Examples include polyvinylpyrrolidone high-molecular compounds such as polyvinylpyrrolidone and polyvinylpyrrolidone/vinyl acetate copolymer, acidic vinyl ether high-molecular compounds such as methyl vinyl ether/maleic anhydride alkyl half ester copolymer, acetic polyvinyl acetate high-molecular compounds such as vinyl acetate/crotonic acid copolymer, acidic acrylic high-molecular compounds such as (meth)acrylic acid/alkyl (meth)acrylate copolymer and (meth)acrylic acid/alkyl (meth)acrylate/alkylacrylamide copolymer, and amphoteric acrylic high-molecular compounds such as N-methacryloylethyl-N,N-dimethylammonium α-N-methylcarboxy-betaine/alkyl (meth)acrylate copolymer and hydroxypropyl (meth)acrylate/butylaminoethyl methacrylate/acrylic acid octylamide copolymer. Naturally-derived high-molecular compounds such as cellulose and its derivatives and keratin or collagen and its derivatives can also be used suitably.

By subjecting the substrate to a silane coupling treatment or a fiber treatment using the organopolysiloxane composition of the present invention, the adhesion of the organic-inorganic composite material after the treatment can be improved. Hereinafter, a method of treating the substrate using the organopolysiloxane composition of the present invention will be described.

The method of treating the substrate using the organopolysiloxane composition of the present invention is not particularly limited, and examples thereof include a method in which the organopolysiloxane composition is applied to the substrate, a method in which the organopolysiloxane composition is entrained with an inert gas, and the substrate is brought into contact with the entrained gas, and a method in which the organopolysiloxane composition is directly mixed with the substrate with a mixer or a mill. Among these methods, a method of applying the organopolysiloxane composition is preferable from the viewpoint of convenience.

Examples of the method of applying the organopolysiloxane composition include a brush coating method, a spray coating method, a wire bar method, a blade method, a roll coating method, and a dipping method.

The conditions for treating the organopolysiloxane composition of the present invention by applying, contacting or mixing on the substrate are not particularly limited as long as the silanol group of the silicone resin (1) reacts with the hydroxyl group on the substrate surface.

A treatment temperature is preferably 0 to 100° C., more preferably 10 to 50° C., and still more preferably 20 to 30° C. from the viewpoint of productivity.

A treatment time is preferably 1 minute to 10 hours, more preferably 1 minute to 5 hours, and still more preferably 1 minute to 2 hours from the viewpoint of productivity, and may be appropriately set in relation to the treatment temperature.

The substrate to be treated may be either an inorganic material or an organic material.

Examples of the inorganic material include silicon compounds such as glass plates, glass fibers, diatomaceous earth, calcium silicate, silica, silicon, talc, and mica; metal oxides such as zinc oxide, aluminum oxide, tin oxide, titanium oxide, iron oxide, and magnesium oxide; metal chlorides such as zinc chloride, aluminum chloride, tin chloride, titanium chloride, iron chloride, and magnesium chloride; metal hydroxides such as aluminum hydroxide and magnesium hydroxide; and carbonates such as calcium carbonate, zinc carbonate, and magnesium carbonate. Among these materials, silicon compounds and metal oxides are particularly preferable from the viewpoint of reactivity with the silanol group of the organopolysiloxane composition.

Examples of the organic material include natural polymers such as rubber, paper, and cellulose; synthetic polymers such as an acrylic resin, a urethane resin, an epoxy resin, and a phenol resin; fats and oils, surfactants, and liquid crystals. Among these materials, natural polymers and synthetic polymers are particularly preferable from the viewpoint of reactivity with the amino group of the organopolysiloxane composition.

After the substrate is treated using the organopolysiloxane composition of the present invention, an excess organopolysiloxane composition can be removed by a usual method such as washing and drying. A post-treatment by washing and drying may be performed alone or in combination.

EXAMPLES

Hereinafter, the present invention will be more specifically described using Synthesis Examples, Examples, Comparative Examples, and Application Examples, but the present invention is not limited to the following Examples.

A weight mean particle size is a volume-based median diameter (D50) measured by a dry laser diffraction method. As the volume-based median diameter, the diameter corresponding to the 50% cumulative value of the volume-based cumulative particle size distribution curve was measured under conditions of a dispersion pressure of 2 bar and a scattering intensity of 2 to 10% by the dry method according to the Fraunhofer diffraction theory using the laser diffraction-type particle size distribution measuring apparatus Mastersizer 3000 (manufactured by Malvern Instruments).

An interface shear strength τ[MPa] of a glass fiber epoxy resin composite material was calculated by the following equation: $\tau = F/\pi DL$, where D [μm] was the diameter of the glass fiber, L [μm] was the length of the glass fiber at a portion embedded in an epoxy resin cured product, and F [mN] was the load when the epoxy resin cured product is pulled out in a glass fiber axis direction, by a micro-droplet method using a composite interface characteristic evaluation device HM 410 (manufactured by Toei Sangyo Co., Ltd.).

[1] Synthesis of Powdery Silicone Resin by Spray Drying Method

Synthesis Example 1

Synthesis of powdery 3-aminopropylsilane triol homopolymer

Water was removed from a 30 wt % aqueous solution of 3-aminopropylsilane triol homopolymer by using a spray drying method (solution feed flow rate: 11 kg/h, drying chamber inlet temperature: 140° C., drying chamber outlet temperature: 85° C., solution supply pressure: 100 kPa) to obtain a powdery 3-aminopropylsilane triol homopolymer.

The resulting powdery 3-aminopropylsilane triol homopolymer was titrated by potentiometric titration to confirm that the amine value was 480.7 KOHmg/g. Measurement by the dry laser diffraction method confirmed that the mean particle size was 40.6 µm, and the loose bulk density was 0.263 g/mL.

[2] Preparation of organopolysiloxane composition

Example 1

One part by weight of the powdery 3-aminopropylsilane triol homopolymer prepared in Synthesis Example 1 and 10 parts by weight of butyric acid as a carboxylic acid compound were added to 100 parts by weight of toluene as an aprotic solvent at room temperature, and the mixture was stirred at room temperature for 24 hours. During stirring, the 3-aminopropylsilane triol homopolymer dissolved, resulting in a homogeneous, pale yellow, clear liquid organopolysiloxane composition.

Example 2

Stirring was carried out in the same manner as in Example 1, except that the aprotic solvent was changed to 100 parts by weight of isododecane. During stirring, the 3-aminopropylsilane triol homopolymer dissolved, resulting in a homogeneous, pale yellow, clear liquid organopolysiloxane composition.

Example 3

Stirring was carried out in the same manner as in Example 1, except that the aprotic solvent was changed to 100 parts by weight of isohexadecane. During stirring, the 3-aminopropylsilane triol homopolymer dissolved, resulting in a homogeneous, pale yellow, clear liquid organopolysiloxane composition.

Example 4

Stirring was carried out in the same manner as in Example 1, except that the aprotic solvent was changed to 100 parts by weight of squalane. During stirring, the 3-aminopropylsilane triol homopolymer dissolved, resulting in a homogeneous, pale yellow, clear liquid organopolysiloxane composition.

Example 5

Stirring was carried out in the same manner as in Example 1, except that the aprotic solvent was changed to 100 parts by weight of tetradecene. During stirring, the 3-aminopropylsilane triol homopolymer dissolved, resulting in a homogeneous, pale yellow, clear liquid organopolysiloxane composition.

Example 6

Stirring was carried out in the same manner as in Example 1, except that the aprotic solvent was changed to 100 parts by weight of squalene. During stirring, the 3-aminopropylsilane triol homopolymer dissolved, resulting in a homogeneous, pale yellow, clear liquid organopolysiloxane composition.

Example 7

Stirring was carried out in the same manner as in Example 1, except that the aprotic solvent was changed to 100 parts by weight of acetone. During stirring, the 3-aminopropylsilane triol homopolymer dissolved, resulting in a homogeneous, brown, clear liquid organopolysiloxane composition.

Example 8

Stirring was carried out in the same manner as in Example 1, except that the aprotic solvent was changed to 100 parts by weight of tetrahydrofuran. During stirring, the 3-aminopropylsilane triol homopolymer dissolved, resulting in a homogeneous, pale yellow, clear liquid organopolysiloxane composition.

Example 9

Stirring was carried out in the same manner as in Example 1, except that the carboxylic acid compound was changed to 10 parts by weight of caproic acid. During stirring, the 3-aminopropylsilane triol homopolymer dissolved, resulting in a homogeneous, pale yellow, clear liquid organopolysiloxane composition.

Example 10

Stirring was carried out in the same manner as in Example 1, except that the carboxylic acid compound was changed to 10 parts by weight of caprylic acid. During stirring, the 3-aminopropylsilane triol homopolymer dissolved, resulting in a homogeneous, pale yellow, clear liquid organopolysiloxane composition.

Example 11

Stirring was carried out in the same manner as in Example 1, except that the carboxylic acid compound was changed to 10 parts by weight of undecylic acid. During stirring, the 3-aminopropylsilane triol homopolymer dissolved, resulting in a homogeneous, pale yellow, clear liquid organopolysiloxane composition.

Example 12

Stirring was carried out in the same manner as in Example 1, except that the carboxylic acid compound was changed to 10 parts by weight of oleic acid. During stirring, the 3-aminopropylsilane triol homopolymer dissolved, resulting in a homogeneous, pale yellow, clear liquid organopolysiloxane composition.

Example 13

Stirring was carried out in the same manner as in Example 2, except that the carboxylic acid compound was changed to 10 parts by weight of oleic acid. During stirring, the 3-aminopropylsilane triol homopolymer dissolved, resulting in a homogeneous, pale yellow, clear liquid organopolysiloxane composition.

Example 14

Stirring was carried out in the same manner as in Example 3, except that the carboxylic acid compound was changed to 10 parts by weight of oleic acid. During stirring, the 3-aminopropylsilane triol homopolymer dissolved, resulting in a homogeneous, pale yellow, clear liquid organopolysiloxane composition.

Example 15

Stirring was carried out in the same manner as in Example 4, except that the carboxylic acid compound was changed to 10 parts by weight of oleic acid. During stirring, the 3-aminopropylsilane triol homopolymer dissolved, resulting in a homogeneous, pale yellow, clear liquid organopolysiloxane composition.

Example 16

Stirring was carried out in the same manner as in Example 5, except that the carboxylic acid compound was changed to 10 parts by weight of oleic acid. During stirring, the 3-aminopropylsilane triol homopolymer dissolved, resulting in a homogeneous, pale yellow, clear liquid organopolysiloxane composition.

Example 17

Stirring was carried out in the same manner as in Example 6, except that the carboxylic acid compound was changed to 10 parts by weight of oleic acid. During stirring, the 3-aminopropylsilane triol homopolymer dissolved, resulting in a homogeneous, pale yellow, clear liquid organopolysiloxane composition.

Example 18

Stirring was carried out in the same manner as in Example 7, except that the carboxylic acid compound was changed to 10 parts by weight of oleic acid. During stirring, the 3-aminopropylsilane triol homopolymer dissolved, resulting in a homogeneous, pale yellow, clear liquid organopolysiloxane composition.

Example 19

Stirring was carried out in the same manner as in Example 8, except that the carboxylic acid compound was changed to 10 parts by weight of oleic acid. During stirring, the 3-aminopropylsilane triol homopolymer dissolved, resulting in a homogeneous, pale yellow, clear liquid organopolysiloxane composition.

Example 20

Stirring was carried out in the same manner as in Example 1, except that the carboxylic acid compound was changed to 10 parts by weight of linoleic acid. During stirring, the 3-aminopropylsilane triol homopolymer dissolved, resulting in a homogeneous, pale yellow, clear liquid organopolysiloxane composition.

Example 21

Stirring was carried out in the same manner as in Example 1, except that the carboxylic acid compound was changed to 10 parts by weight of linolenic acid. During stirring, the 3-aminopropylsilane triol homopolymer dissolved, resulting in a homogeneous, pale yellow, clear liquid organopolysiloxane composition.

Comparative Example 1

Although stirring was carried out in the same manner as in Example 1 except that the carboxylic acid compound was not used, the 3-aminopropylsilane triol homopolymer was not dissolved.

Comparative Example 2

Although stirring was performed in the same manner as in Example 1, except that 1 part by weight of the powdery 3-aminopropylsilane triol homopolymer prepared in Synthesis Example 1 was changed to 1 part by weight of a massive 3-aminopropylsilane triol homopolymer prepared using a vacuum dryer and a pulverizer, the 3-aminopropylsilane triol homopolymer was not dissolved.

Application Example 1

[1] Fiber Treatment with Organopolysiloxane Composition

Glass fibers (length: about 300 mm, diameter: about 23 μm) were immersed in the solution of the organopolysiloxane composition obtained in Example 1 at 25° C. for 30 minutes to perform a fiber treatment, and then the glass fibers were lifted from the solution and dried at 70° C. for 2 hours to perform a post-treatment.

[2] Molding of glass fiber epoxy resin composite material

Droplets having a diameter of about 100 μm of an epoxy resin composition composed of an epoxy resin (JER 828 manufactured by Mitsubishi Chemical Corporation) and a curing agent (triethylenetetramine manufactured by Tokyo Chemical Industry) were attached to the organopolysiloxane-treated glass fiber obtained above so that the droplets did not contact each other, and then thermally cured at 80° C. for 1.5 hours in the first stage and at 100° C. for 2 hours in the second stage to mold a glass fiber epoxy resin composite material.

Application Example 2

The fiber treatment and the molding of the composite material were performed in the same manner as in Application Example 1 except that the organopolysiloxane composition was changed to the solution of Example 2.

Application Example 3

The fiber treatment and the molding of the composite material were performed in the same manner as in Application Example 1 except that the organopolysiloxane composition was changed to the solution of Example 12.

Comparative Application Example 1

Glass fibers (length: about 300 mm, diameter: about 23 μm) not subjected to fiber treatment with the organopolysiloxane composition were used, and a glass fiber epoxy resin composite material was molded in the same manner as in Application Example 1 [2].

[Performance Evaluation]

The interface shear strength τ[MPa] of the glass fiber epoxy resin composite material molded in each of Application Examples 1 to 3 and Comparative Application Example 1 was measured by a microdroplet method using a composite interface characteristic evaluation device HM 410 (manufactured by Toei Sangyo Co., Ltd.). The larger the numerical value, the better the adhesion of the glass fiber epoxy resin composite material. The results are shown in Table 1.

TABLE 1

| | Silicone resin | Interface shear strength (MPa) |
|---|---|---|
| Application Example 1 | 3-aminopropylsilane triol homopolymer | 26.8 |
| Application Example 2 | 3-aminopropylsilane triol homopolymer | 29.7 |
| Application Example 3 | 3-aminopropylsilane triol homopolymer | 24.9 |
| Untreated | none | 16.9 |

As shown in Table 1, it is found that in the glass fiber epoxy resin composite material obtained in Application Examples 1 to 3, a plurality of silanol groups contained in the powdery silicone resin react with a plurality of hydroxyl groups on a surface of the glass fiber, and in addition, an amino group reacts with the epoxy resin, so that the adhesion to the glass fiber epoxy resin composite material is improved.

Japanese Patent Application Nos. 2021-143095, 2021-168967 and 2022-123039 are incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A transparent organopolysiloxane composition consisting of a powdery silicone resin having the following general formula (1), a carboxylic acid compound or a natural oil containing the carboxylic acid compound, and an aprotic solvent,

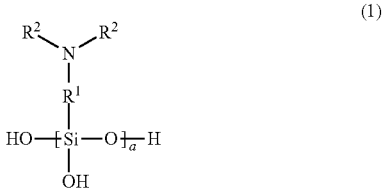

wherein $R^1$ each independently represents a substituted or unsubstituted divalent hydrocarbon group having 1 to 20 carbon atoms which may contain a hetero atom, $R^2$ each independently represents a hydrogen atom, a methyl group, or an ethyl group, and a represents an integer of 2 to 70.

2. The organopolysiloxane composition according to claim 1, wherein a mean particle size of the silicone resin measured by a dry laser diffraction method is 1 to 200 μm as a volume-based median diameter.

3. The organopolysiloxane composition according to claim 1, wherein the silicone resin is spray-dried particles.

4. The organopolysiloxane composition according to claim 1, wherein the carboxylic acid compound is one or two or more selected from a saturated monocarboxylic acid compound having 1 to 11 carbon atoms and an unsaturated monocarboxylic acid compound having 3 to 22 carbon atoms.

5. The organopolysiloxane composition according to claim 1, wherein the aprotic solvent is one or two or more selected from a saturated aliphatic hydrocarbon-based solvent, an unsaturated aliphatic hydrocarbon-based solvent, an aromatic hydrocarbon-based solvent, and a ketone-based solvent.

* * * * *